C. W. BREIDENBACH & E. E. EUCHENHOFER
DOOR-CHECK.

No. 169,407. Patented Nov. 2, 1875.

WITNESSES
Robert Everett
George E. Upham

INVENTOR
Conrad W. Breidenbach,
Edward E. Euchenhofer
By Chipman Hosmer & Co
Attorneys

UNITED STATES PATENT OFFICE.

CONRAD W. BREIDENBACH AND EDWARD E. EUCHENHOFER, OF DAYTON, OHIO.

IMPROVEMENT IN DOOR-CHECKS.

Specification forming part of Letters Patent No. 169,407, dated November 2, 1875; application filed August 14, 1875.

*To all whom it may concern:*

Be it known that we, CONRAD W. BREIDENBACH and EDWARD E. EUCHENHOFER, both of Dayton, in the county of Montgomery and State of Ohio, have invented a new and valuable Improvement in Door-Checks; and we do hereby declare that the following is a full, clear, and exact description of the construction and operation of the same, reference being had to the annexed drawings making a part of this specification, and to the letters and figures of reference marked thereon.

Figure 1:
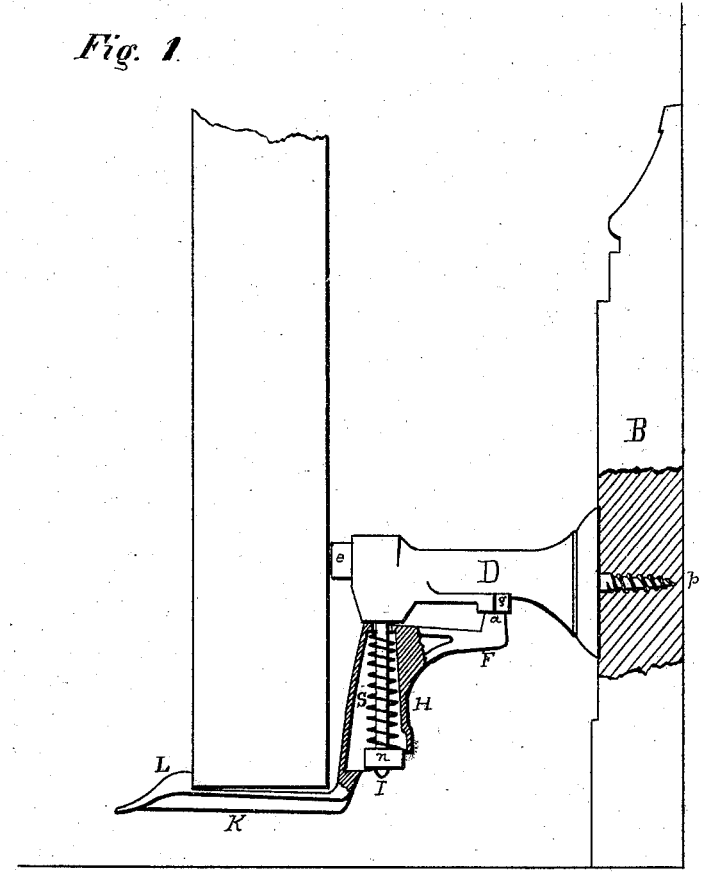
Figure 2:
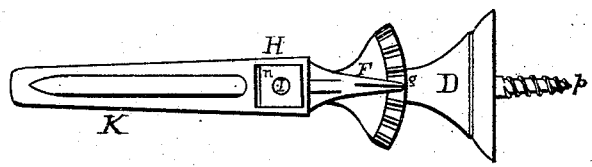

Figure 1 of the drawings is a sectional view of our door-check as applied, and Fig. 2 is a plan view thereof.

This invention has relation to improvements in combined door stops and catches, the object of which is to prevent the door from slamming to when opened, and to prevent the knob from defacing the wall.

The nature of the improvement consists in the combination, with a cushion, of a door-stop having upon its under side a segmental rack, a rotating catch having a pawl engaged with the said rack, and a spring and pawl, whereby the said catch is yieldingly attached to the stop, by which means the catch is rendered adjustable, and is adapted to be used with any description of door, as hereinafter more fully shown and described.

In order to enable those skilled in the art to which our invention appertains to make and use the same, the following description of its construction and operation is given.

The letter D represents a stud or stop, made of any suitable metal, in one end of which is recessed the rubber cushion $e$, said stud having, at its other end, the screw $p$, for fastening the catch and stop to the wall B. On the lower side of said stud, in a position intermediate to the cushion $e$ and the screw $p$, and transverse to the longer axis of the said stud, is formed a segmental rack, $g$, the object of which will be hereinafter shown. I indicates a metallic rod of suitable length, projecting downwardly from the free end of the said stud, on which rod is arranged the hollow shank H of the catch or hook. This shank is of tubular form, its upper hollow portion being in transverse section elliptical, and its lower portion rectangular. It has, upon its lower end, at right angles thereto, or nearly so, a hook or catch, K, and upon its upper end, and projecting in an opposite direction from the said catch, a rigid arm, F, having a tooth, $a$, the object of which will hereinafter appear.

The tubular shank of this catch is passed upward over the rod 1, and is held to its engagement therewith by means of a nut, $n$, applied upon the lower screw-threaded end of the said rod. In this position the tooth $a$ of the rigid pawl or arm F is in engagement with the segmental rack $g$, upon the under side of stud D, and is held to such engagement by means of a helical spring, S, on rod 1, said spring having been strongly compressed when the nut $n$ was applied upon the lower end of the said rod.

The forefoot L of the catch proper is barbed, and is designed, when the door is brought in contact with it, to cause the catch to descend, allowing the door to fall into the recess behind the barb through the yielding to further compression of the spring S.

The peculiar construction of the catch and its rigid pawl, and of the stud with its segmental rack, enables the hook of the catch to be placed at any angle, so that the said hook shall at all times be at right angles to the plane of the door when it is desired to catch it; but by pulling the hollow shank H downwardly, thereby compressing the helical spring S until the pawl F is disengaged from the segmental rack $g$, and then turning it, the said shank can be thrown out of position for catching the door altogether.

What we claim as new, and desire to secure by Letters Patent, is—

1. In a door stop and catch, the combination, with a stud, D, having segmental rack $g$, of a rotating catch or hook, K, having rigid pawl F, substantially as specified.

2. The combination, with stud D, having segmental rack $g$, and downwardly-projecting rod I, of the rotating catch or hook K, having pawl F, and a spring, S, applied upon rod I and nut $n$, substantially as specified.

In testimony that we claim the above we have hereunto subscribed our names in the presence of two witnesses.

CONRAD W. BREIDENBACH.
    EDWARD E. EUCHENHOFER.

Witnesses:
    H. J. SCHINEL,
    D. G. BREIDENBACH.